United States Patent
Hariharan et al.

(10) Patent No.: US 9,118,595 B2
(45) Date of Patent: Aug. 25, 2015

(54) GRACEFUL FAILOVER OF A PRINCIPAL LINK IN A FIBER-CHANNEL FABRIC

(71) Applicant: Cisco Technology, Inc., San Jose, CA (US)

(72) Inventors: Anand Hariharan, San Jose, CA (US); Christian Sasso, Milpitas, CA (US); Ronak Desai, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 14/194,672

(22) Filed: Mar. 1, 2014

(65) Prior Publication Data

US 2014/0177431 A1 Jun. 26, 2014

Related U.S. Application Data

(63) Continuation of application No. 11/559,845, filed on Nov. 14, 2006, now Pat. No. 8,705,344.

(51) Int. Cl.

| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/931* | (2013.01) |
| *H04L 12/24* | (2006.01) |
| *G06F 11/20* | (2006.01) |
| *H04L 12/703* | (2013.01) |
| *H04L 29/12* | (2006.01) |

(52) U.S. Cl.
CPC .......... *H04L 49/357* (2013.01); *G06F 11/2007* (2013.01); *H04L 41/0654* (2013.01); *H04L 41/0659* (2013.01); *H04L 45/28* (2013.01); *H04L 49/50* (2013.01); *H04L 61/6045* (2013.01)

(58) Field of Classification Search
None
See application file for complete search history.

(56) References Cited

U.S. PATENT DOCUMENTS

| | | | |
|---|---|---|---|
| 4,965,788 | A | 10/1990 | Newman |
| 5,150,360 | A | 9/1992 | Perlman et al. |
| 6,032,194 | A | 2/2000 | Gai et al. |
| 6,324,162 | B1 * | 11/2001 | Chaudhuri ............... 370/225 |
| 6,388,995 | B1 | 5/2002 | Gai et al. |
| 6,400,681 | B1 | 6/2002 | Bertin et al. |
| 6,535,491 | B2 | 3/2003 | Gai et al. |
| 6,697,339 | B1 | 2/2004 | Jain |
| 6,813,241 | B1 * | 11/2004 | Wang et al. ............... 370/228 |
| 6,882,630 | B1 | 4/2005 | Seaman |
| 6,976,088 | B1 | 12/2005 | Gai et al. |
| 7,428,658 | B2 | 9/2008 | Nagin et al. |
| 7,457,322 | B1 | 11/2008 | Flood et al. |
| 7,830,880 | B2 | 11/2010 | Sasso et al. |

(Continued)

OTHER PUBLICATIONS

Author Unknown, NCTIS Working Draft, ANSI, Fibre Channel Switch Fabric No. 3, Revision 6.3, Feb. 19, 2003.

(Continued)

*Primary Examiner* — Christopher Crutchfield

(74) *Attorney, Agent, or Firm* — Fernando Hale & Chang LLP

(57) ABSTRACT

In one embodiment, detecting a failure mode of a first communication link on a first port, selecting a second communication link on a second port associated with the first port, and transmitting a profile information associated with the second port are provided.

17 Claims, 6 Drawing Sheets

(56) References Cited

U.S. PATENT DOCUMENTS

| | | |
|---|---|---|
| 2001/0056503 A1 | 12/2001 | Hibbard |
| 2002/0181503 A1 | 12/2002 | Montgomery, Jr. |
| 2003/0043736 A1* | 3/2003 | Gonda ............................ 370/218 |
| 2003/0123389 A1 | 7/2003 | Russell et al. |
| 2003/0218986 A1 | 11/2003 | DeSanti et al. |
| 2005/0265260 A1 | 12/2005 | Zinin et al. |
| 2006/0268686 A1* | 11/2006 | Shei et al. ...................... 370/217 |
| 2007/0207591 A1 | 9/2007 | Rahman et al. |
| 2008/0072000 A1 | 3/2008 | Osaki et al. |
| 2009/0141700 A1 | 6/2009 | Baldemair et al. |

OTHER PUBLICATIONS http://www.cisco.com/warp/public/cc/pd/ps4159/ps4358/prodlit/zonev_wp.pdf, Author Unknown, Using VSANs and Zoning in the Cisco MDS 9000 Family of Multilayer Fibre Channel Switches.

* cited by examiner

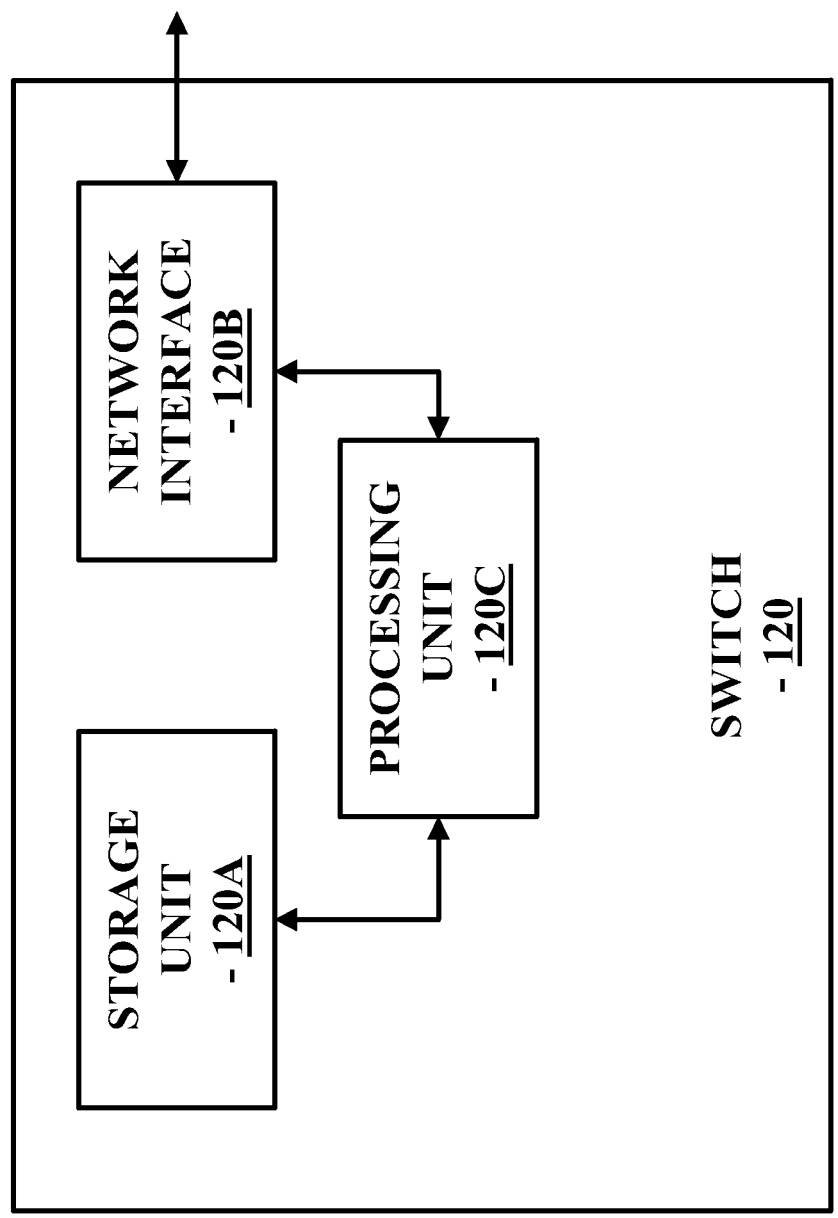

GRACEFUL FAILOVER OF A PRINCIPAL LINK IN A FIBER-CHANNEL FABRIC

RELATED APPLICATION

This application is a continuation of U.S. patent application Ser. No. 11/559,845, filed Nov. 14, 2006, titled "Graceful Failover of a Principal Link in a Fibre-Channel Fabric," the disclosure of which is hereby incorporated by reference in its entirety.

TECHNICAL FIELD

The present disclosure relates generally to graceful failover of a principal link in a data network.

BACKGROUND

A fibre channel fabric typically uses a set of interconnected host bus adapters ((HBAs) which connects a host in/out bus to a computer terminal's memory), bridges, storage devices and switches. A storage area network (SAN) installation may include multiple fabrics for redundancy. Typically, a fabric may be considered as a set of switches sharing inter-switch links (ISLs) together with the devices to which they are connected. A SAN with multiple switches not connected by ISLs provide multiple fabrics.

Existing fibre channel fabrics have scalability limitations with the continued increase in the support of ports and virtual SANs (VSANs) on each switch. Indeed, when the principal link on a switch fails, there is a flood to fabric (Build-fabric) reconfiguration phase on all ports, all VSANs and all switches in the fabric. In turn, this leads to increase in the system load and may potentially result in control frame drops, instability, or large re-convergence times for the fabric on each VSAN.

SUMMARY

Overview

Overview A method in particular embodiments may include detecting a failure mode of a first communication link on a first port, selecting a second communication link on a second port associated with the first port, and transmitting a profile information associated with the second port. A method in particular embodiments may include detecting a failure mode of a principal link on a first port, selecting a redundant link on a second port associated with the first port, transmitting a profile information associated with the second port.

An apparatus in particular embodiments may include a first switch configured to detect a failure mode of a principal link on a first port of the first switch, select a redundant link on a second port of the first switch associated with the first port, and transmit a profile information associated with the second port.

These and other features and advantages of the present disclosure will be understood upon consideration of the following description of the particular embodiments and the accompanying drawings.

BRIEF DESCRIPTION OF THE DRAWINGS

FIG. 1B illustrates an example switch in the system illustrated in FIG. 1;

DETAILED DESCRIPTION

Figure 1A:
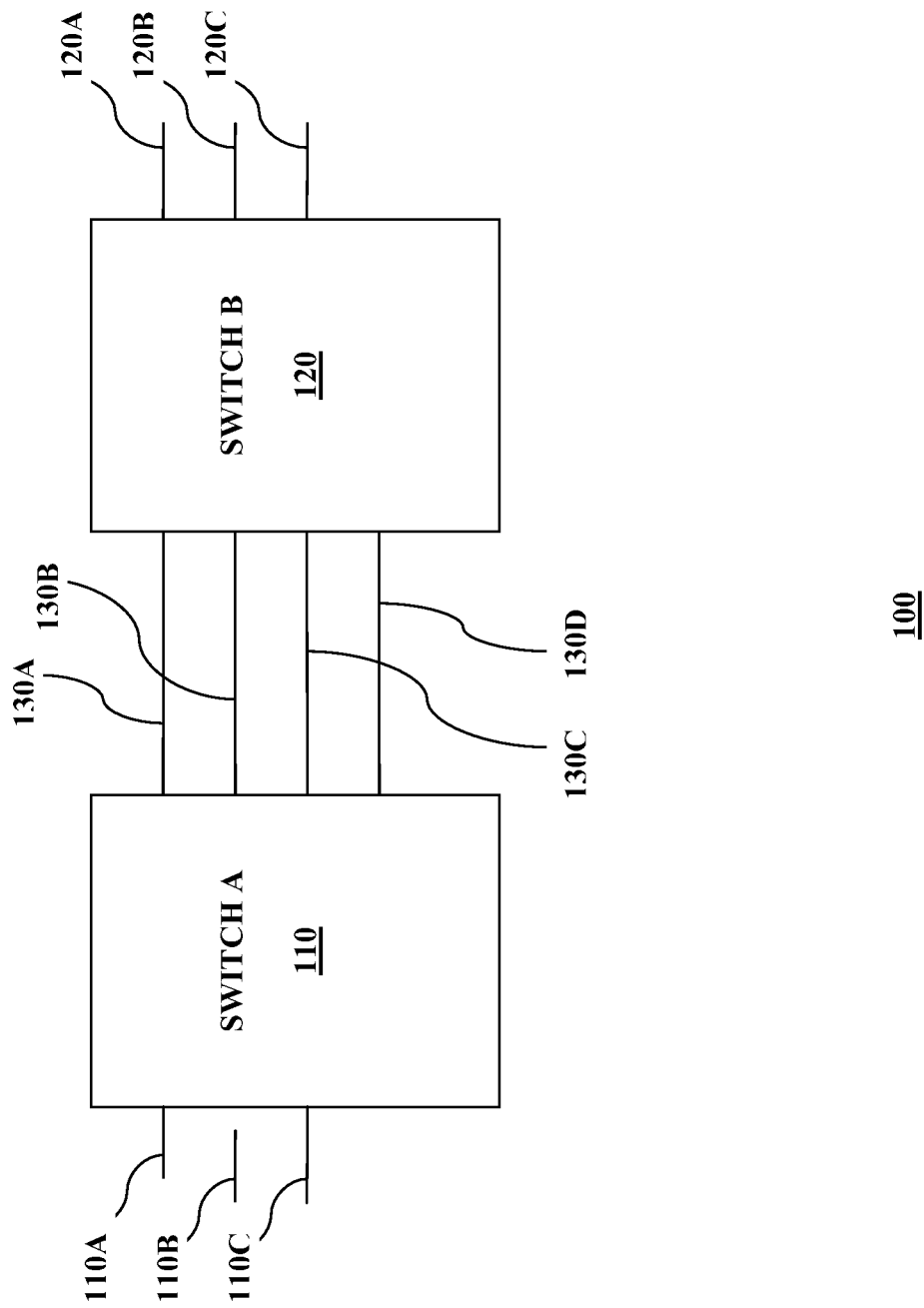
FIG. 1A is an example system for graceful failover of a principal link in a data network.

FIG. 1A is an example system for graceful failover of a principal link in a data network. Referring to FIG. 1A, there is provided a first switch 110 configured to couple to a second switch 120 by a plurality of communication links 130A, 130B, 130C, 130D. Referring to FIG. 1A, in one embodiment, first switch 110 may further include communication links 110A, 110B, 110C, each of which may be configured to operatively couple to one or more other network devices in the fibre channel fabric. Similarly, in one aspect, second switch 120 may further include communication links 120A, 120B, 120C each of which may be configured to operatively couple to one or more other network devices in the fibre channel fabric. Referring again to FIG. 1A, while two switches 110, 120 are shown, within the scope of the present disclosure, additional switches and/or network devices may be provided within the fibre channel fabric.

Referring again to FIG. 1A, in one embodiment, each switch 110, 120 may be configured to obtain peer-identity information for every port and store the obtained peer identity information (for example, in a tabular form within a memory device (not shown) of the switches 110, 120). In one aspect, the peer identity information is configured to uniquely identify the associated switch, and may include, for example, a world wide name (WWN), a MAC address, and the like. In one aspect, the peer identify information such as the peer-WWN may be obtained by, one or more approaches includes, for example, exchange link parameter (ELP) frame exchange or a domain identifier assigned (DIA) exchange.

For example, in a fibre channel, device addressing may be handled in one of several ways. The first approach uses the worldwide name (WWN) of the device which is a 64-bit address that uniquely identifies each device globally to ensure that no duplicate WWNs are in the fibre channel network. This may be used to make basic user-level management changes such as zoning for device access. Another approach uses fibre channel identification (FCID) which is 24-bit and is configured to be a dynamic address assigned by the fabric when a device logs in to reduce complexity of addressing for internal use by the fabric.

More specifically, the FCID may include three components—the domain, the area and the port. The domain is a unique number assigned to each switch in a logical fabric. A domain ID assigned to a switch may range, for example, from 1 to 239. This number includes the first 8 bit of the FCID. The area is an 8-bit area field which is assigned by the switch also. The area can range from 0 to 255. In some cases, the area may be assigned by using the physical port number (for example, port 3 out of 16 ports) limiting availability in some operating systems. The port field is also 8 bits and ranges from 0 to 256, in one example. The port field is unique in that it also is used to assign the arbitrated loop physical address (ARPA) for devices that use loop. When arbitrated loop is not used, the port field may be set to 0.

Using the domain, the area and the port fields, each device is assigned a 24-bit FCID when it logs into the fabric, and may be used as a simplified addressing scheme, replacing the WWN internally to the fabric including the name server queries to routing. While WWNs are unique globally, FCIDs are required to be unique only within the logical fabric in which they are assigned.

Referring back to FIG. 1A, in particular embodiments, using one or more mechanisms described above, switch 110 may be configured to identify or determine the unique peer-identity information of the switch 120, and similarly, the switch 120 may be configured to identify or determine the unique peer-identity information of the switch 110, such that every port on the switches 110, 120 is configured to obtain the information associated with the other switch peer-identity information.

Thereafter, as described in further detail below, when one of the communication links 130A, 130B, 130C, 130D designated as the principal link fails, another one of the communication links 130A, 130B, 130C, 130D designated as redundant links may be assigned as a new principal link between the switch 110 and switch 120, and upon recovery from the failed state, the previously designated principal link may be, in one embodiment, designated as a redundant link. In this manner, in one embodiment, the failed principal link between switch 110 and switch 120 may be isolated and addressed rather than propagating the failed link state throughout the network causing additional processing load, and increased convergence time, and additional downtime, for example.

FIG. 1B illustrates an example switch in the system illustrated in FIG. 1. Referring to FIG. 1A, the switch 120 in particular embodiments includes a storage unit 120A operatively coupled to a processing unit 120C. In particular embodiments, the processing unit 120C may include one or more microprocessors for retrieving and/or storing data from the storage unit 120A, and further, for executing instructions stored in, for example, the storage unit 120A, for implementing one or more associated functions related to graceful failover of a communication link in a network. Referring again to FIG. 1A, in one aspect, the switch 120 may include a network interface 120B which may be configured to interface with for example, the switch 110, or network devices in the network.

In particular embodiments, as discussed in further detail below, the memory or storage unit 120A of the switch 120 may be configured to store instructions which may be executed by the processing unit 120C to detect a failure mode of a first communication link on a first port, select a second communication link on a second port associated with the first port, and transmit a profile information associated with the second port.

Figure 2:
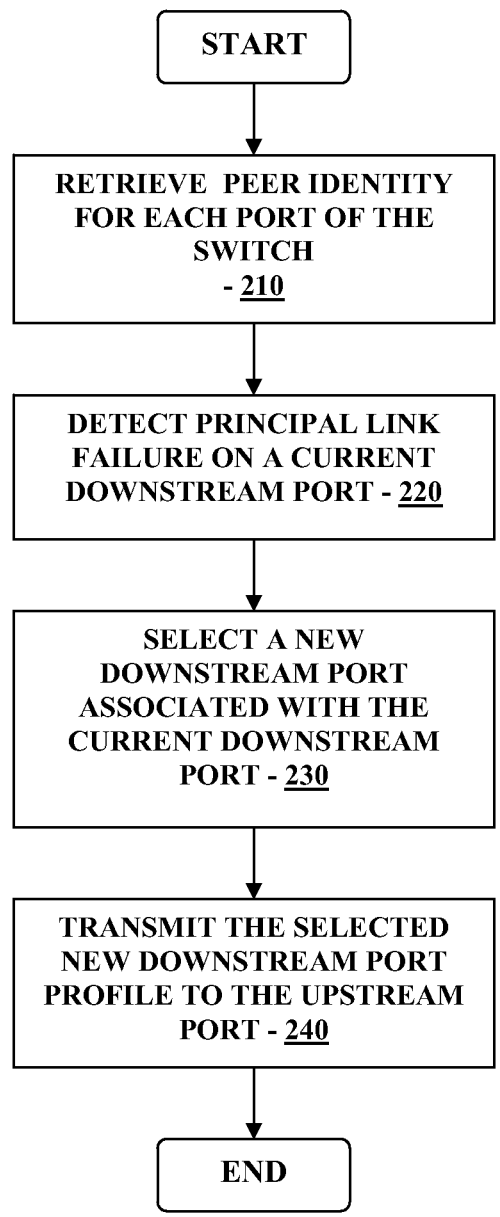
FIG. 2 illustrates an example method for providing a graceful failover of a communication link in a network.

FIG. 2 illustrates an example method for providing a graceful failover of a communication link in a network. Referring to FIG. 2, in particular embodiments, the peer identity information for each port of the switch is retrieved or determined at step 210. For example, referring back to FIG. 1A, switch 110 is configured to identify the peer-WWN information of the ports on the switch 120, and likewise, switch 120 is configured to identify the peer-WWN information of the ports on the switch 110 in the fibre channel fabric.

Referring back to FIG. 2, after determining the peer identity information, a failure mode of the principal link of the switch on a current downstream port is detected at step 220. In particular embodiments, the failure mode of the principal link of the switch may include one or more of a reloaded linecard, a disconnected port associated with the switch, or any other failure mode of the principal link of the respective port on the switch in the fibre channel fabric. For example, referring to FIG. 1A, in particular embodiments, when the principal link (e.g., communication link 130A) connecting an upstream port on switch 110 with the corresponding downstream port on switch 120 enters a failure mode, switch 120 may be configured to detect the failure of the communication link 130A, and thereafter, select a new downstream port on the switch 120 from the remaining ports that have the same peer-identity information (for example, peer-WWN) as the failed principal link (i.e., the communication link 130A) at step 230.

Thereafter, switch 120 may be further configured to transmit the newly selected downstream port profile (for example, the peer-WWN associated with communication link 130B) to the corresponding port on switch 110 at step 240. That is, in particular embodiments, switch 120 may be configured to select one of the ports associated with one of the communication links 130B, 130C, 130D and designate the selected port (for example, associated with communication link 130B) as the newly selected downstream port for the principal link to switch 110.

More specifically, in particular embodiments, switch 120 may be configured to signal the newly selected downstream port information to switch 110 based on a predetermined signaling protocol or using other data signaling techniques such as by transmission of one or more exchange fabric parameter (EFP) frame. For example, in particular embodiments, when the principal link fails (for example, when the communication link 130A enters a failure mode), switch 110 is configured to detect the signaling message (for example, the EFP frame) from the newly designated downstream port of switch 120. Upon receipt of the signaling message from switch 120 on one of its non-principal ports (for example, one of the ports corresponding to communication links 130B, 130C, 130D), switch 110 in particular embodiments is configured to convert the one port associated with communication link 130B where the signaling message was received from switch 120 into the new upstream port, and thus designating communication link 130B as the new principal link for switch 110 and switch 120.

Figure 3:
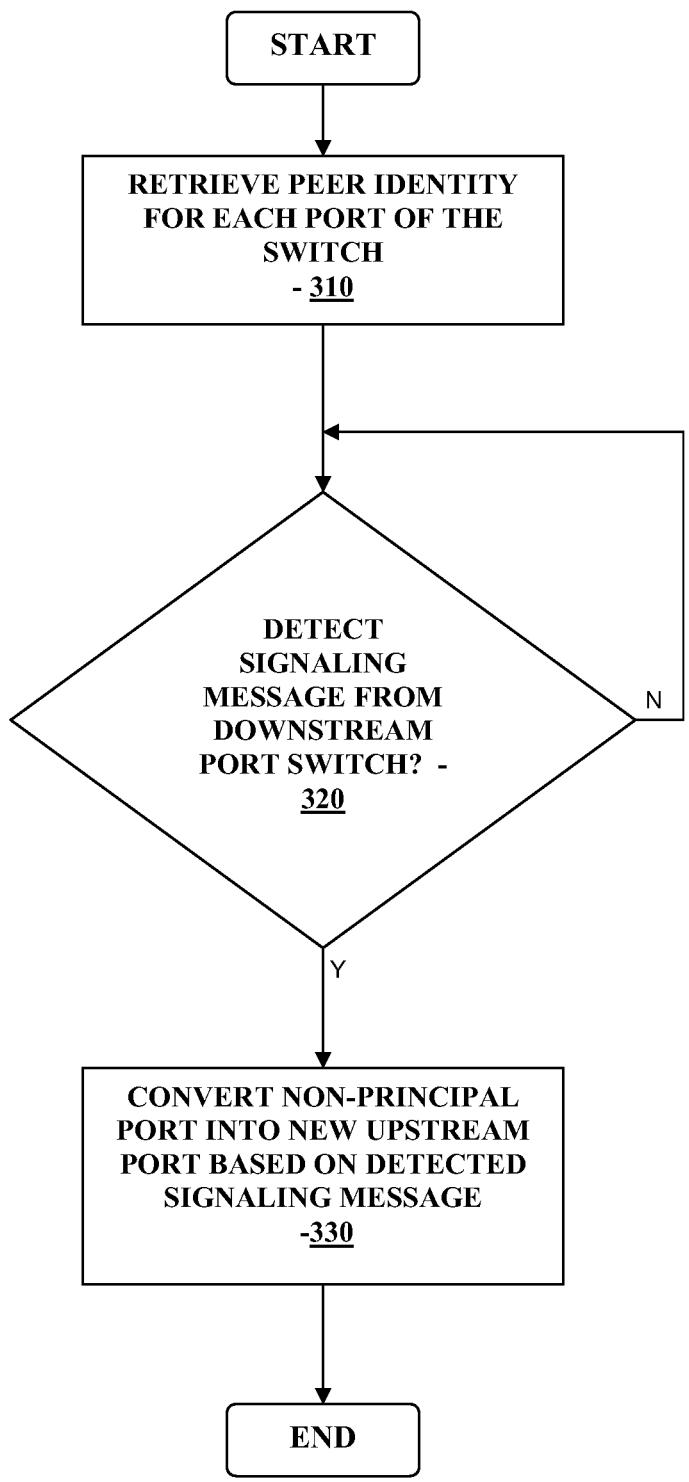
FIG. 3 illustrates an example method for providing a graceful failover of a communication link in a network.

FIG. 3 illustrates an example method for providing a graceful failover of a communication link in a network. Referring to FIG. 3, in particular embodiments, peer identity information is retrieved at step 310 for each port of the switch in the fabric. Thereafter at step 320, it is determined whether a signaling message from a downstream port switch is received.

Referring again to FIG. 3, if it is determined at step 320 that the signaling message is not received from the downstream port switch, then the routine continues to monitor the upstream port for signaling message from a corresponding downstream port switch. If on the other hand at step 320 it is determined that the signaling message was received from the downstream port switch, then at step 330, a non-principal switch is converted into a new upstream port based on the detected signaling message.

For example, referring back to FIGS. 1 and 3, switch 110 in particular embodiments is configured to obtain peer identity information such as peer-WWN of each port of switch 120. Thereafter when the principal link connecting switch 110 to switch 120 fails, switch 110 is configured to monitor its non-principal ports for signaling message from switch 120. When the signaling message is received from switch 120 at one of the non-principal ports, switch 110 is configured to designate or select the one of the non-principal ports at which the signaling message is received as the new principal port connected to the new principal link.

In this manner, in particular embodiments, switch 110 with the upstream ports is not configured to introduce a build fabric (BF) on all the communication links connected to switch 110.

Furthermore, in one aspect, no handshaking procedure with switch 120 is needed, based on the signaling message designating the new principal link.

Figure 4:
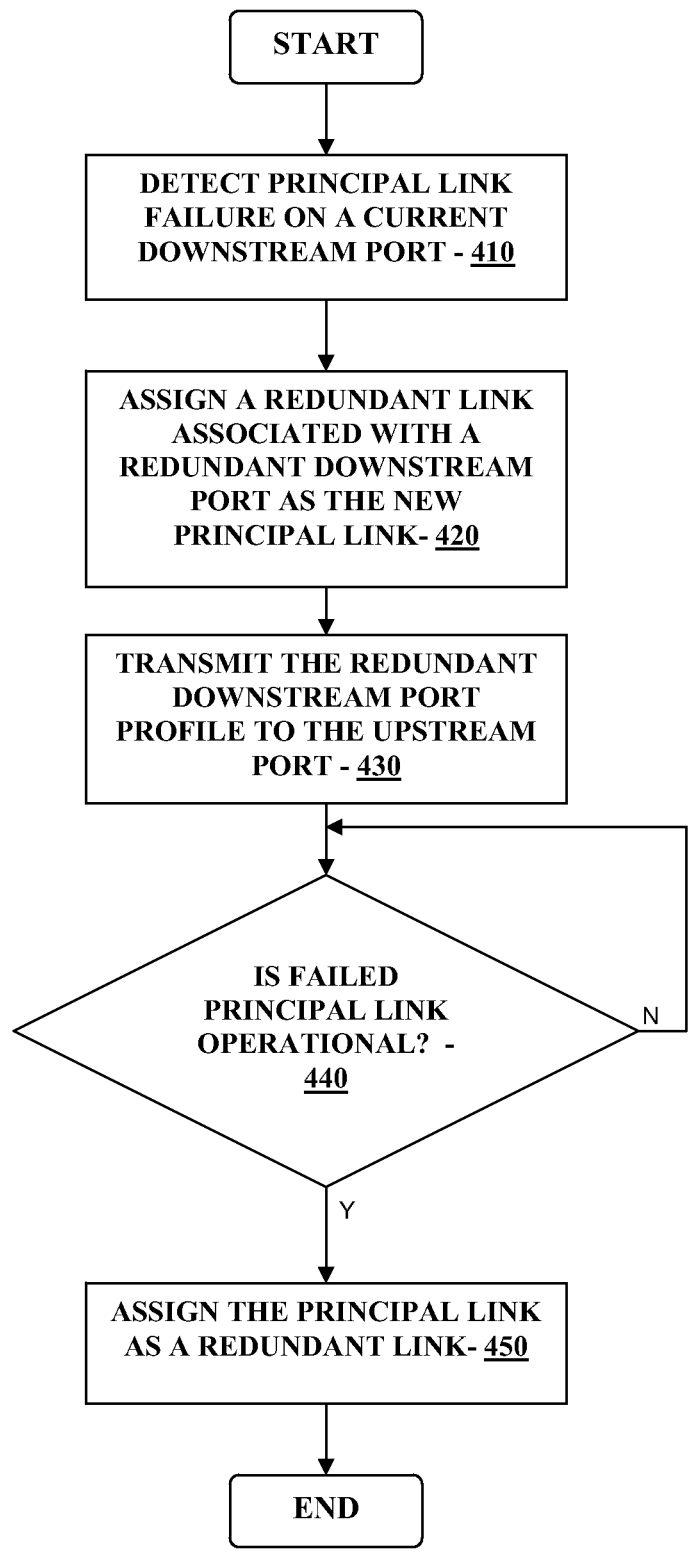
FIG. 4 illustrates an example method for providing a graceful failover of a communication link in a network.

FIG. 4 illustrates an example method for providing a graceful failover of a communication link in a network. Referring to FIG. 4, in particular embodiments, a principal link failure is detected on a current downstream port of a switch at step 410. Thereafter at step 420, a redundant communication link associated with a redundant downstream port is assigned as the new principal link. Then, at step 430, the redundant downstream port profile is transmitted to the corresponding upstream port in the fibre channel fabric.

Referring back to FIG. 4, at step 440, it is determined whether the failed principal link has recovered from the failure mode. If at step 440 it is determined that the failed principal link has not recovered from the failure mode, then the routine continues to monitor the operational state of the failed principal link at step 440. On the other hand, if it is determined at step 440 that the failed principal link has recovered from the failure mode and is operational, then at step 450, the recovered principal link is assigned as a redundant link.

In this manner, in particular embodiments, when the principal link which was previously in a failed state becomes operational again, the recovered principal link is designated as a redundant link such that the redundant link which was assigned as the new principal is maintained as the principal link, while the recovered principal link is designated as a redundant link.

Figure 5:
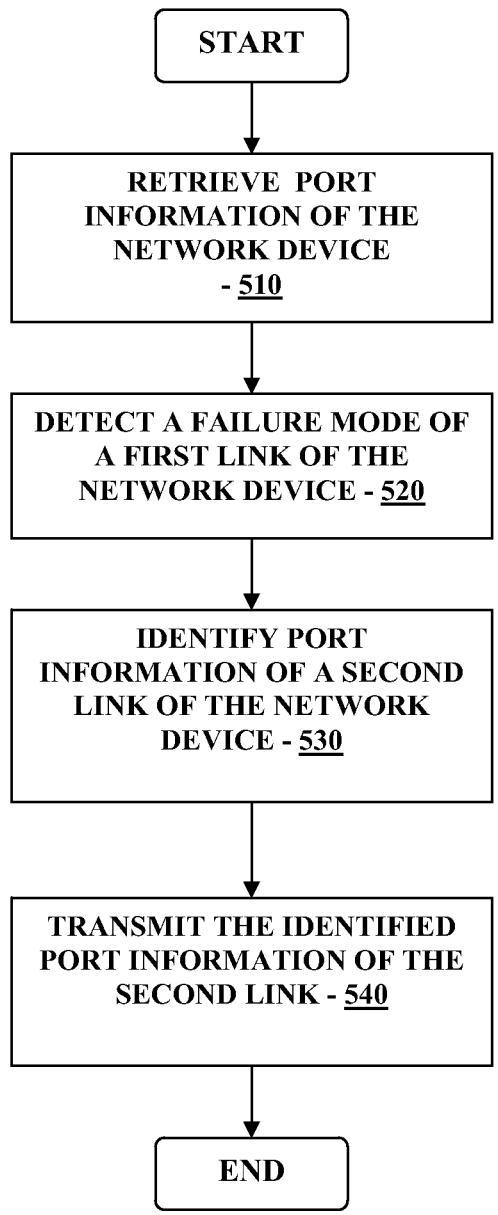
FIG. 5 illustrates an example method for providing a graceful failover of a communication link in a network.

FIG. 5 illustrates an example method for providing a graceful failover of a communication link in a network. Referring to FIG. 5, in particular embodiments, a port information of a network device is retrieved at step 510. Thereafter, a failure mode of a first link on one of the ports of the network device is detected at step 520. When the failure mode of the first link on one of the ports of the network device is detected, a port information associated with a second link of the network device is identified at step 530. For example, in particular embodiments, a peer-WWN information or a MAC address of a redundant port of the network device is identified, and thereafter, transmitted to the corresponding port associated with another network device to which the second link is connected.

In this manner, in particular embodiments, when the principal link between network devices fails, a redundant link is identified as a new principal link, and the failed principal link is designated as a redundant link upon recovery from its failure mode.

In the manner described above, in accordance with the particular embodiments, there are provided method and system for avoiding flood to fabric reconfiguration phase when a principal link on a switch goes down. In one aspect, as network topologies include high number of links (for example, Eports) connected to other switches, there are redundant links to the principal link where, for example, more than one link is connected to the same peer switch as in the case for the principal link. Thus, in one aspect, the redundant principal links are identified as they are brought up. That is, in particular embodiments, peer WWNs may be obtained before the port is brought up using the peer WWNs contained in the exchange link parameters (ELP) during the exchange of link parameters. Alternatively, the peer WWN may be determined from the assigned domain ID (DIA) frames during the principal link selection process.

In this manner, in one aspect, the peer WWN may be determined before the port is brought up for data traffic to run. Once each port's peer WWN is determined, the ports that are redundant principal links may be identified as those which have the same peer-WWN as the principal link. Since each principal link includes a downstream port or an upstream port, for each downstream port or an upstream port in a switch, a mutually exclusive redundant subset of ports may be identified.

When the principal link fails, in particular embodiments, the switch with the downstream port counterpart of the principal link may be configured to select from the subset of its redundant ports a new downstream port. It should be noted that in particular embodiments, the switch is configured to not send out or introduce a build fabric (BF) on all its links. Rather, in one aspect, the new downstream port may be configured to send out an exchange fabric parameter (EFP) frame with the available domain list in the frame.

In addition, in a further aspect, the switch that includes the upstream counterpart port of the principal link which failed is configured to not introduce a build fabric (BF) on its links. That is, when the switch that includes the upstream counterpart port of the failed principal link receives the EFP frame on one of its candidate redundant upstream ports, this switch is configured to update its data structure to associate the candidate redundant upstream port as the new upstream port associated with the new downstream port.

In this manner, as described above, the switch from a principal link that went down to a redundant principal link is achieved in the fibre channel fabric without any flood-to-fabric on all ports throughout the fabric. Furthermore, by implementing the above described procedure on all VSANs in the fabric, the load on the entire fabric is reduced. Accordingly, in particular embodiments, flood-to-fabric reconfiguration throughout the fibre channel fabric is avoided on all VSANs when the principal link goes down, by identifying redundant principal links and switching to them substantially seamlessly in the event of a loss of the principal link.

In this manner, in particular embodiments, there are provided method and system for avoiding flood to fabric reconfiguration phase in the event of a link failure on a switch. The particular embodiments of the present disclosure may be configured to reduce load, improve scalability and improve the convergence time of the fibre channel fabric, while minimizing potential interoperability issues across other implementation platforms.

A method in particular embodiments may include detecting a failure mode of a first communication link on a first port, selecting a second communication link on a second port associated with the first port, and transmitting a profile information associated with the second port.

The profile information in one aspect may include an exchange fabric parameter (EFP) frame.

Each of the first port and the second port in particular embodiments may be associated with a respective one of a peer-world wide name (WWN) or a MAC address.

In a further aspect, the first communication link may include a principal link, while the second communication link may include a redundant link.

Additionally, the first communication link may be in an inactive state when the failure mode is detected, and further, when the first communication link recovers from the failure mode, the communication on the second communication link may be maintained.

A method in particular embodiments may include detecting a failure mode of a principal link on a first port, selecting a redundant link on a second port associated with the first port, and transmitting a profile information associated with the second port.

In one aspect, the principal link may be in an inactive state when the failure mode is detected, and further, when the principal link recovers from the failure mode, data communication may be maintained on the redundant link.

An apparatus in particular embodiments may include a first switch configured to detect a failure mode of a principal link on a first port of the first switch, select a redundant link on a second port of the first switch associated with the first port, and transmit a profile information associated with the second port.

In particular embodiments, the first communication link may be operatively coupled to a second switch and further, where the first communication link may be in an inactive state when the failure mode is detected. Moreover, when the first communication link recovers from the failure mode, the first switch may be configured to maintain the communication with the second switch on the second communication link.

An apparatus in particular embodiments may include means for detecting a failure mode of a principal link on a first port of the first switch, means for selecting a redundant link on a second port of the first switch associated with the first port, and means for transmitting a profile information associated with the second port.

The various processes described above including the processes performed by the switch 100 or switch 120 in the software application execution environment in the example system 100 including the processes and routines described in conjunction with FIGS. 2-5, may be embodied as computer programs developed using an object oriented language that allows the modeling of complex systems with modular objects to create abstractions that are representative of real world, physical objects and their interrelationships. The software required to carry out the inventive process, which may be stored in the memory or storage unit 120A of the switch 120 (or similar storage unit of the switch 110) may be developed by a person of ordinary skill in the art and may include one or more computer program products.

Various other modifications and alterations in the structure and method of operation of the particular embodiments will be apparent to those skilled in the art without departing from the scope and spirit of the disclosure. Although the disclosure has been described in connection with specific particular embodiments, it should be understood that the disclosure as claimed should not be unduly limited to such particular embodiments. It is intended that the following claims define the scope of the present disclosure and that structures and methods within the scope of these claims and their equivalents be covered thereby.

What is claimed is:

1. A method, comprising:
by a first switch:
establishing a first communication link with a second switch between a first port of the first switch and a first port of the second switch;
designating the first communication link as a principal link;
establishing a second communication link with the second switch between a second port of the first switch and a second port of the second switch;
designating the second communication link as a redundant link;
detecting a failure of the first communication link;
in response to the failure:
designating the second communication link as the principal link; and
transmitting profile information associated with the second port of the first switch to the second switch over the second communication link, the profile information including an exchange fabric parameter (EFP) frame;
detecting a recovery of the first communication link; and
designating the first communication link as the redundant link in response to the recovery.

2. The method of claim 1, further comprising, by the first switch, subsequently to detecting the failure of the first communication link, determining that the first communication link has not recovered.

3. The method of claim 2, further comprising, by the first switch, monitoring an operational state of the first communication link in response to the determination that the first communication link has not recovered.

4. The method of claim 1, wherein the first and second ports of the first switch are each associated with a respective one of a peer-world wide name (WWN) or a MAC address.

5. The method of claim 1, further comprising, by the first switch, selecting the second communication link from among a plurality of communication links between the first and second switches for designating the redundant link.

6. The method of claim 1, wherein said transmitting the profile information is performed according to a predetermined signaling protocol.

7. The method of claim 1, further comprising, by the second switch, designating the second port of the second switch as a principal port in response to receiving the profile information from the first switch.

8. A system, comprising:
an upstream switch having a first upstream port and a second upstream port; and
a downstream switch having a first downstream port and a second downstream port, the downstream switch being communicatively coupled to the upstream switch over a first communication link between the first upstream port and the first downstream port and a second communication link between the second upstream port and the second downstream port;
wherein the downstream switch is configured to:
designate the first communication link as a principal link;
designate the second communication link as a redundant link;
detect a failure of the first communication link;
in response to the failure, designate the second communication link as the principal link; and transmit profile information associated with the second downstream port to the upstream switch over the second communication link, the profile information including an exchange fabric parameter (EFP) frame;
detecting a recovery of the first communication link subsequent to the failure; and
designate the first communication link as the redundant link in response to the recovery.

9. The system of claim 8, wherein the downstream switch is further configured to, subsequently to detecting the failure of the first communication link, determine that the first communication link has not recovered.

10. The system of claim 9, wherein the downstream switch is further configured to monitor an operational state of the first communication link in response to the determination that the first communication link has not recovered.

11. The system of claim 8, wherein the first and second downstream ports are each associated with a respective one of a peer-world wide name (WWN) or a MAC address.

12. The system of claim 8, wherein the downstream switch is further configured to select the second communication link from among a plurality of communication links between the upstream switch and the downstream switch for designating the redundant link.

13. The system of claim 8, wherein the downstream switch is configured to transmit the profile information according to a predetermined signaling protocol.

14. The system of claim 8, wherein the upstream switch is configured to designate the second port of the second switch as a principal port in response to receiving the profile information from the downstream switch.

15. A switch, comprising:
    a first port;
    a second port; and
    control circuitry configured to:
        establish a first communication link with an upstream switch between the first port and a first upstream port of the upstream switch;
        designate the first communication link as a principal link;
        establish a second communication link with the upstream switch between the second port and a second upstream port of the upstream switch;
        designate the second communication link as a redundant link;
        detect a failure of the first communication link;
        in response to the failure:
            designate the second communication link as the principal link; and
            transmit profile information associated with the second port to the upstream switch over the second communication link, the profile information including an exchange fabric parameter (EFP) frame;
        detect a recovery of the first communication link; and
        designate the first communication link as the redundant link in response to the recovery.

16. The switch of claim 15, wherein the control circuitry is further configured to, subsequently to detecting the failure of the first communication link, determine that the first communication link has not recovered.

17. The switch of claim 16, wherein the control circuitry is further configured to monitor an operational state of the first communication link in response to the determination that the first communication link has not recovered.

* * * * *